Feb. 6, 1945.    A. P. LEE ET AL    2,368,669
PURIFICATION AND DEODORIZATION PROCESS
Filed July 11, 1939    5 Sheets-Sheet 1

INVENTORS
Alan Porter Lee
Walter Gray King Jr
By ... ATTORNEY.

Feb. 6, 1945. A. P. LEE ET AL 2,368,669
PURIFICATION AND DEODORIZATION PROCESS
Filed July 11, 1939 5 Sheets-Sheet 4

INVENTORS
Alan Portis Lee
Walter Gray King Jr.
BY
their ATTORNEY.

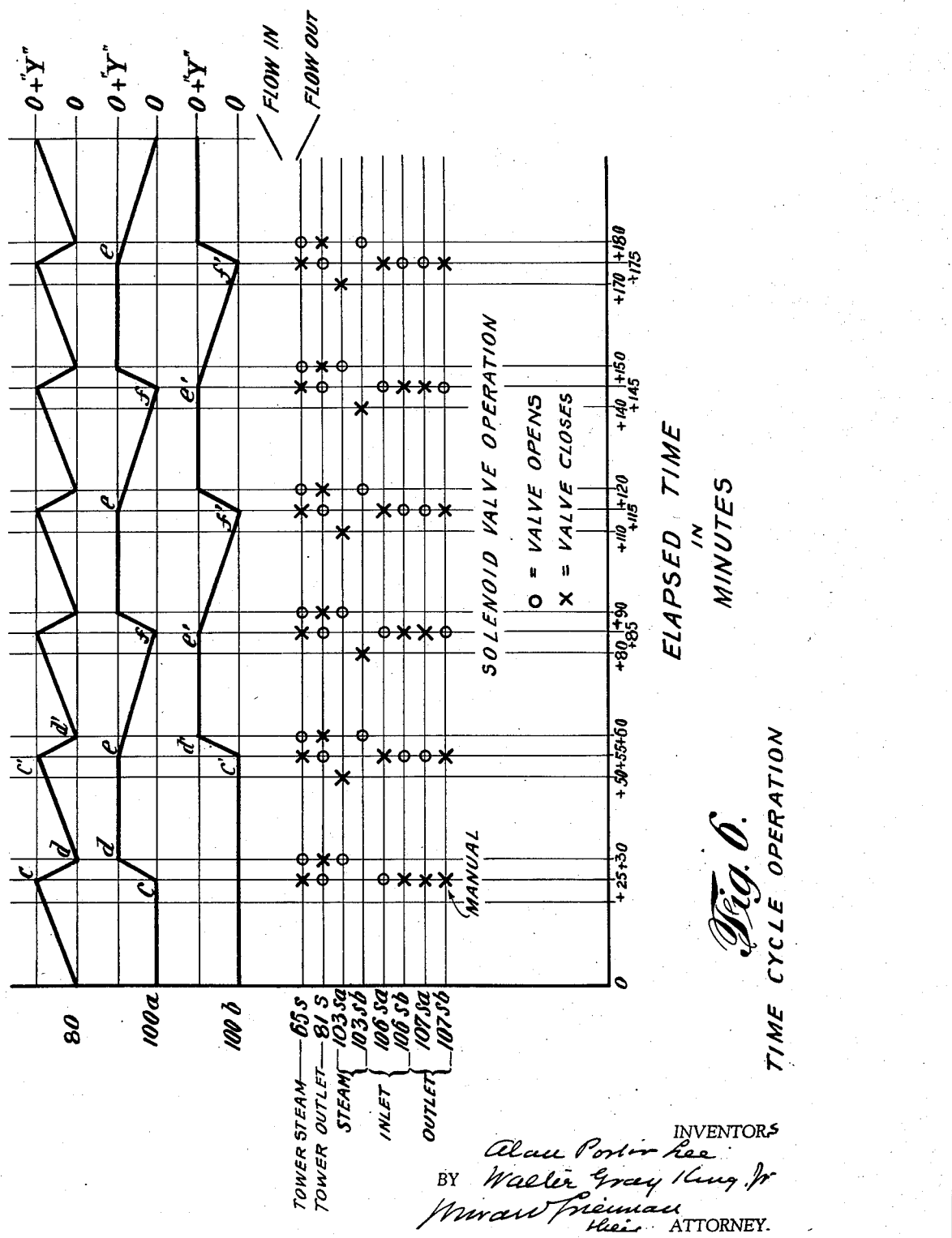

Patented Feb. 6, 1945

2,368,669

UNITED STATES PATENT OFFICE 2,368,669

PURIFICATION AND DEODORIZATION PROCESS

Alan Porter Lee, Madison, and Walter Gray King, Jr., Montclair, N. J.

Application July 11, 1939, Serial No. 283,720

12 Claims. (Cl. 202—46)

This invention relates to improvements in processes, methods and apparatus for distillatory purification or deodorization of glyceride oils. By "glyceride oils" we mean to designate fatty oils or fats of animal, vegetable or synthetic origin. Throughout our application below we use the terms "glyceride," "glycerides," "glyceride oils" and "liquid" interchangeably, such terms being understood to refer herein to those glyceryl esters or mixtures of esters of fat acids which are commonly called "fats," "fatty oils," "fixed oils" or "glycerides," regardless of their origin. By the term "fat acid" as used herein we mean any organic acid naturally occurring in fats or oils, either in a glyceryl ester or as uncombined acid, or any synthetic homologue of any such acid; all such acids, natural or synthetic, often being referred to as "fatty acids."

Methods of purifying and deodorizing glyceride oils by distilling away volatile impurities have been practiced extensively for many years and have developed from simple early empiric forms to more modern methods in which the principles of physical chemistry and chemical engineering are applied to the processes involved.

The basic operation is the application of heat for volatilization of the impurities while so controlling such heat application that the temperature of vaporization of the oil being deodorized or purified will not be reached and that degradation or decomposition of said oil from the effect of heating will be minimized. An important application of such distillatory deodorizing and purifying processes is to be found in treatment of the glycerides, (oils and fats), natural, synthetic, or hydrogenated, for food product manufacture.

All natural fats and oils, animal or vegetable, as found in nature contain small percentages of substances other than the glycerides of the fat acids and it is from these small percentages of non-glyceridic substances that the natural odors and flavors of the fats and oils are derived. Such natural odors and flavors are not unpleasant in glycerides freshly produced from choice raw materials. In the channels of commerce, however, it is inevitable that considerable time will elapse between the formation of fats and oils in their animal or vegetable sources and their arrival on consumers' tables in the form of food or food ingredients. During such lapse of time certain degenerative changes often occur which alter the flavors of the natural fatty substances, generally rendering them less palatable. Such changes include greater or less decomposition of the flavor-generating substances; slight decomposition or oxidation of the coloring matters which are also present in very minute percentages; partial hydrolysis of the glycerides themselves, with formation of glycerine and free fat acids; decomposition of the glycerine so formed into alcohols of lower hydroxylation and into acrolein.

Such changes cause the pleasant flavors and odors of natural fats to be replaced by others less pleasant. In many instances, furthermore, it is desirable to remove even the pleasant flavors of fresh natural fats or oils, as the collective preference of the consuming public demands more and more bland, neutral-flavored fats and oils, which are subject to flavoring to taste by means of kitchen seasonings.

In modern refining and processing of fats and oils, contact of these materials with various chemical substances such as the alkalies used to remove the bulk of the free fat acids, the bleaching materials used for color improvement, or the catalytic substances employed to influence hydrogenation, causes injury to the natural flavor and not infrequently the addition of undesirable foreign flavors and odors.

Fats and oils are seen thus for several reasons to require deodorization for improvement of flavor as well as of odor, and to procure this deodorization distillatory methods are in universal use.

The basis of all methods of distillatory deodorization of oils is the application of heat for vaporization of the small percentages of substances which impart flavors and odors to the oil being deodorized, while carefully limiting the amount and range of heat input in order to minimize thermal or oxidative decomposition of the oil under treatment and to avoid vaporization of the main body of said oil.

As applied to fats and oils, the distillatory deodorization process has developed through several stages, including: first, simple heating for volatilization of odorous substances; second, addition of steam or other non-reacting vapor or gas during the heating, to complement the vapor pressure of the substances to be distilled away, thus lowering the temperature of their volatilization; third, superheating steam so used to increase its thermal effectiveness; fourth, reducing the total pressure in the distilling vessel by means of condensers for the distillate and for the steam, thus further reducing the temperature of the desired distillation and at the same time reducing the degree of incidental oxidative decomposition of the fat or oil being deodorized.

Attempts have been made to reduce the operation to a continuous process, in contrast to one of an intermittent or batch type or nature, but because of the exacting requirements and limitations of the deodorizing process, these attempts have not up to the present time achieved a degree of success comparable to the marked perfection of continuous distilling processes in general.

Advantages to be expected of a continuous distillatory deodorizing process over a batch type procedure include: reduction in time of treatment; reduction in size of necessary apparatus for a given output capacity; economy in fuel because of lower radiation losses of smaller apparatus as well as because of facility of heat exchange between incoming and outgoing materials; economy in the use of distilling steam through application of the principle of counterflow to the passage of steam and liquid through the distilling apparatus.

Most of these objectives can be obtained by the application of well known apparatus and methods in continuous operation, as, for example, heating a flowing stream of the oil to be deodorized in a continuous tubular heater, passing said oil to the upper portion of a vacuum bubble-tray tower or similar apparatus, where it encounters in its descent over the trays a rising current of superheated steam, by the aid of which the undesired volatiles, (ketones, aldehydes, free fat acids and the like), are vaporized, passing from the tower top with the steam to suitable condensation apparatus. The treated oil, presumably entirely deodorized, flows from the bottom of the vacuum tower through suitable heat economizing apparatus, where it transmits heat to the incoming liquid feed, thence to a point of further cooling, finally to storage or use.

In the practical application of the above-cited basic principles to the continuous deodorization of fats and oils, there are important additional requirements which must be met in order to insure finished products of the highest quality. These requirements are applicable to, and are limitations of all distillatory deodorization operations, whether of the batch or continuous type, and it is toward the fulfillment of these requirements in continuous operation that our present invention is directed.

These requirements and limitations may be set forth briefly here as follows:

1. Practially all the oils which are subject to distillatory deodorization are of delicate constitution and are readily subject to thermal decomposition, therefore the heating method selected must be of such character that thermal decomposition is avoided.

2. Oxidative changes also must be avoided insofar as possible, therefore the distillation must be conducted at the lowest practical absolute pressure, not only for thermal economy, but also for the exclusion of oxygen or air.

3. Experience has shown that the optimum conditions for most complete vaporization of the odorous volatile substances are attained at miximum safe temperatures and minimum absolute pressures, therefore since a certain amount of pressure drop is inevitable in all practical counter-current vacuum distilling apparatus, provision must be made for ample contact of the oil being deodorized with the steam or other inert gaseous carrier at the condition of minimum pressure in conjunction with maximum temperature.

4. Reflux condensation into the oil being deodorized, of even small amounts of the odorous distillate must be prevented by suitable methods and means. The return of separated entrained liquid is undesirable also, because such entrainment is usually contaminated with odorous substances when separated from the stream of distillate vapors.

5. In all counter-current apparatus arranged for contact of liquids and gases or vapors, there is possibility of considerable short-circuiting flow of untreated liquid through the apparatus into the completely treated liquid in the lower portion of said apparatus, therefore, since even a small amount of untreated oil will contaminate a large amount of deodorized oil and render the deodorization useless, provision must be made for effective prevention of even slight flow of untreated oil into the finished deodorized product.

6. The finished deodorized oil must not be exposed to the action of oxygen or to that of atmospheric air until thoroughly cooled, therefore suitable cooling apparatus of vacuum or inert-gas-charged type must be provided.

7. In order to obtain maximum deodorization or distillation effect, steam or other inert gas in a condition of purity, that is of substantial freedom from admixture or saturation with the volatile products of deodorization or distillation, must be applied to the oil being deodorized or purified, under conditions of minimum pressure and elevated temperature.

8. In order that the volatile substances shall be completely vaporized with the aid of minimal quantities of distillation steam, the vapor pressures of such substances at the superior liquid surfaces must be maintained at practical maxima, therefore dilution of the least-deodorized oil subjacent to such superior liquid surfaces must be avoided insofar as is practicable.

It is an object of our present invention to provide a continuous process for distillatory deodorization or purification of glycerides which will meet any and all of the above-listed requirements and limitations.

Another object of our invention is to provide a method of distillatory deodorization or purification of glycerides in which purified glycerides of superior quality will be readily obtained.

The above-mentioned objects and other objects of our invention will be fully understood from the following description in conjunction with the accompanying drawings which diagrammatically show preferred embodiments of our invention.

The drawings herewith represent equipment assemblies suitable for use in application of our invention, as well as typical process-flow therein, but these drawings are not to be construed as limitations of our invention, except insofar as they may represent new features of apparatus structure or assembly hereinbelow claimed.

In order that our invention may be clearly understood, we refer to the drawings herewith, in which:

Figure 6 is a graphic representation of controlled time-cycle operation as practiced in the process of our invention.

Figure 1:
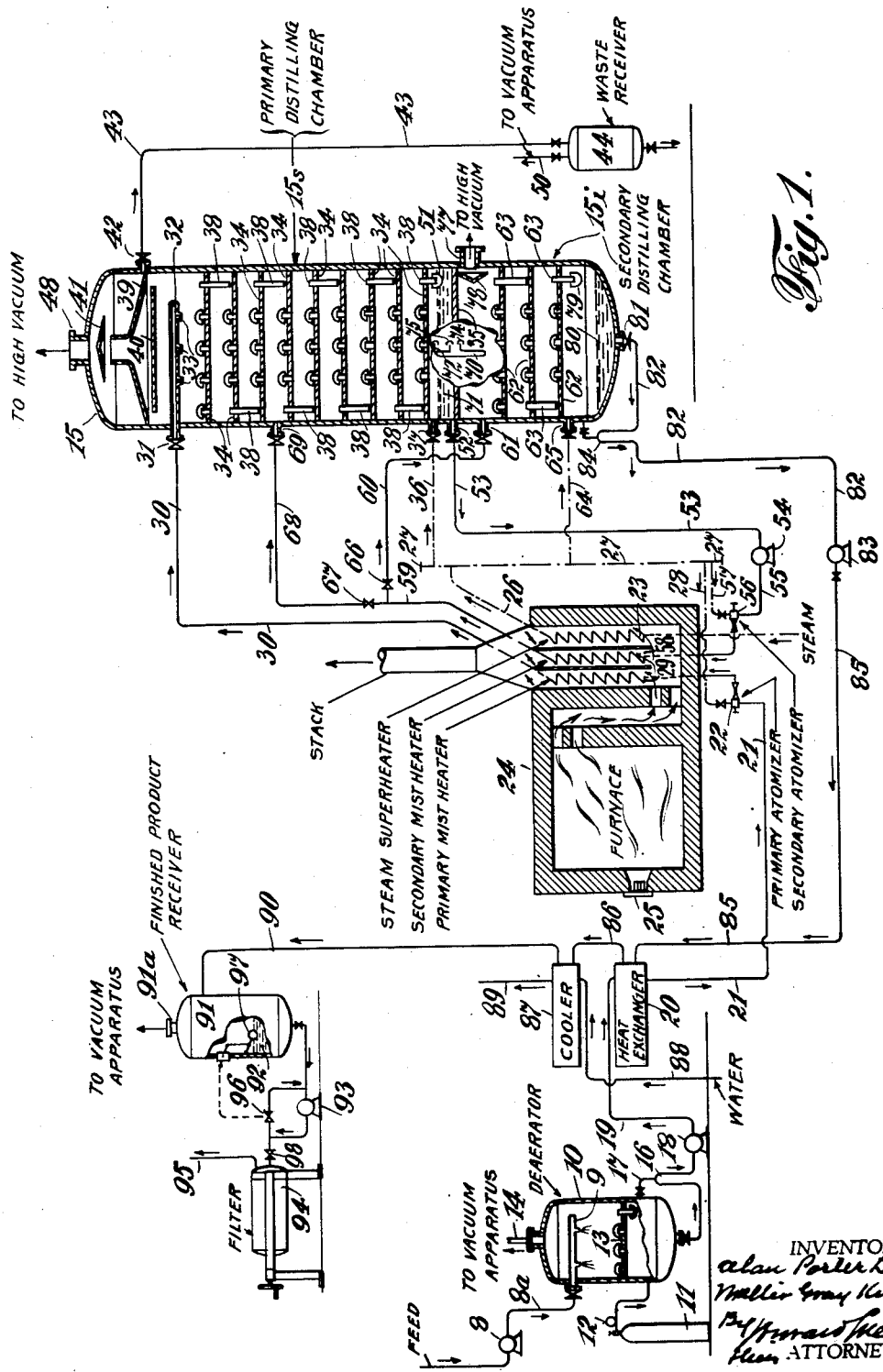
Figure 1 is a diagrammatic elevation, partly in section, of one form of apparatus suitable for operation of our invention.

Referring to Figure 1, which, as stated above, is an elevation, partly in section, of one form of our process apparatus, pump 8 is a metering pump through which a glyceride oil to be purified or deodorized is fed to the apparatus in a controlled continuous stream, from any suitable source, (not shown).

The oil to be treated flows from pump 8 through the pipeline 8a and the spray distributor 9, from which it falls in the form of drops or spray in the body of the vacuum de-aerating chamber 10, in which said drops or spray of the oil to be deodorized or purified are brought into intimate contact with a stream of water-free inert gas, such as nitrogen or carbon dioxide gas, which is admitted to the de-aerator 10 from the pressure-storage cylinder 11 through the pressure-reducing and regulating valve 12. One or more bubble-cap trays 13, or equivalent devices for promotion of counter-current contact between liquid and gas, are installed in the vacuum de-aerating chamber 10 between the spray distributor 9 and the point of entrance of the inert gas coming from the cylinder 11.

The vacuum de-aerating chamber 10 is connected by the pipeline 14 to any suitable high-vacuum apparatus, (not shown), or to the upper portion of the purifying column 15, which is maintained at high vacuum. In its passage as drops or spray through the de-aerating chamber, by the combined action of the vacuum and the counter-stream of inert gas, the oil undergoing purification is freed of dissolved oxygen, air or other undesirable non-condensable gases, all of these being replaced by the inert gas such as nitrogen or carbon dioxide gas.

Falling to the lower portion of the de-aerator 10, the glycerides undergoing treatment form a pool the depth of which is regulated by the loop in the pipeline 16 and the vacuum-vent line 17 connecting said loop with the de-aerating chamber 10. From the pool so maintained in the lower portion of the de-aerating chamber 10, the de-aerated oil is drawn in controlled quantity through the pipeline 16 by the metering pump 18 and is discharged through the pipeline 19 and the shell-and-tube heat exchanger 20, in passing through which latter it absorbs considerable heat from the outflowing purified oil, which flows counter-currently through the exchanger 20, as described later, but without admixture with the incoming partially treated oil.

Passing on through the pipeline 21, the oil undergoing purification enters the primary atomizing device 22, where it is atomized with several times its own volume of a suitable protective inert gas, such as dry saturated or superheated steam. In the atomizing device 22 the oil undergoing purification is dispersed as a discontinuous phase of discrete particles or droplets, entirely surrounded by a continuous phase of inert gas.

In the apparatus shown in Figure 1, saturated steam at any convenient low pressure, such as 10 to 20 pounds per square inch gauge, is admitted to the heating coil 23 in the furnace 24, where it is heated by any suitable means such as by gases of combustion from the fluid-fuel burner 25, to a desired degree of superheat, such as, for example, a final temperature approximating the maximum temperature to be reached at any stage of our purifying process by the oil undergoing purification. The superheated steam passes from the heating coil 23 through the pipeline 26 to the superheated-steam header 27, whence all the various inert gas requirements of our process are supplied, with exception of water-free inert gas used in de-aeration, as above described, or elsewhere, as will appear. From the header 27 superheated steam is supplied to the primary atomizer 22 through the pipeline 28.

From the primary atomizing device the atomized mist of liquid oil droplets in inert gas flows through the coil 29 in the furnace 24, in passing through which coil it is heated to a temperature lower than the initial volatilization temperature, at the pressure condition existing in the coil 29, of the impurities to be distilled from the glycerides being deodorized, but higher than the initial volatilization temperature of the said impurities under the subsequent reduced absolute pressure condition in the distilling column or tower.

Passing from the coil 29, the atomized mist travels through the pipeline 30 and issues in the form of mist or spray from the nozzles 33 of the spray distributor 32 in the upper portion of the distilling column or tower 15. The flow of atomized mist into the distilling column may be regulated by the throttling valve 31. The distilling column 15 is divided into two separate chambers, 15s (upper) and 15i (lower) by means of the solid partition plate 35. The upper chamber 15s is equipped with spaced multiple bubble-cap trays 34 or equivalent devices designed to promote contact between a falling liquid and a rising gas or vapor within the chamber.

Superheated steam is admitted in controlled amount to the upper chamber 15s of the distilling column through the pipeline 36 and the control valve 37. This superheated steam, rising in the chamber 15s and bubbling through the liquid on the trays serves as inert gas in adding its vapor pressure to that of the volatile impurities to be distilled from the glycerides being purified or deodorized, thus reducing the temperature of vaporization of such volatiles. The superheated steam serves the additional function of replacing heat lost by radiation and thus helping maintain desired distillation temperatures in the chamber 15s.

The sprayed liquid mist descending through the tower forms a pool of liquid on the uppermost bubble-cap tray 34, which pool of liquid is subjected to intimate contact of the superheated steam rising through the bubble caps. The liquid overflows from tray to tray through the oppositely positioned alternate downflow pipes 38 and the volatile impurities vaporize and pass upward with the superheated steam. In this manner the bulk of the volatile impurities is distilled from the oil undergoing purification or deodorization.

In the deodorization of glyceride oils the volatile impurities (odorous and flavoring materials) consist of aldehydes, ketones, fat acids and similar substances. In this general type of distillatory purification it is desirable to prevent, insofar as possible, the refluxing of any condensed impurities or separated liquid entrainment to the main body of liquid. In order to minimize return of such reflux condensation from the under surface of the tower top, we provide the arresting chimney-baffle 39, the flat baffle 40 and the conical baffle 41. Any condensation from the inner surface of the upper dome of the distilling chamber is collected above the plate 39 and can be removed from the distilling zone continuously or intermittently by means of the valve 42 and the pipeline 43 leading to the waste receiver 44.

Figure 5:
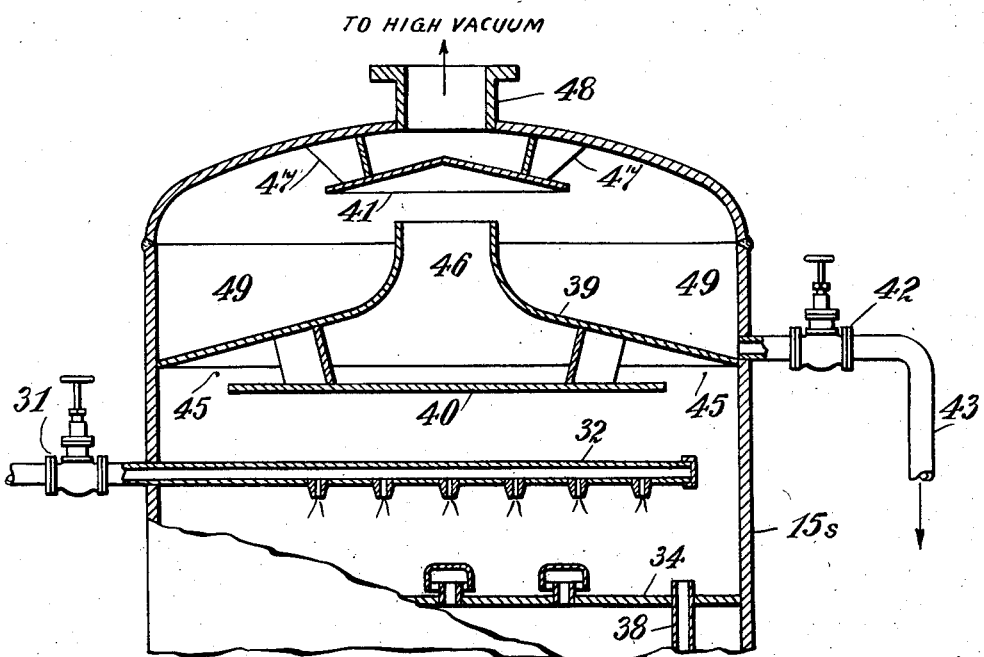
Figure 5 is a view, partly in section, of the upper portion of a deodorizing or distilling tower, embodying our arrangements for prevention of reflux of separated entrainment or condensed volatiles to the body of liquid undergoing treatment.

More constructional detail of our entrainment separator is shown in Figure 5. The mixed vapors of volatile impurities and inert gas rising in the distilling chamber are deflected by the flat baffle 40 through the annular passage 45. Passing with increased velocity through the throat 46 of the chimney-baffle 39, the vapors lose velocity in the space 49 above said chimney-baffle and are again deflected through the second annular passage 47 around the conical baffle 41, passing from this space into the nozzle 48, thence entirely away from the distilling column toward the vacuum-producing apparatus (not shown). Any unvaporized liquid entrained by the mixed vapors will tend to be deposited during passage through the space 49 above the chimney-baffle 39 because of velocity reduction after passage through the throat 46 of said chimney-baffle.

Such deposited entrainment, (together with any liquid entrainment which separates in the nozzle 48, falls upon the upper surface of the conical baffle 41 and is deflected thereby above the chimney-baffle 39), can be withdrawn continuously or intermittently through the valve 42 and the pipeline 43 to the waste receiver 44 (Figure 1), which is maintained under vacuum by means of the connection 50 to vacuum apparatus (not shown).

The apparatus shown in Figure 5 is one example only of suitable equipment for separate removal of reflux condensation and separated entrainment in our process. This feature of our process invention resides in arrangement for separation and removal of such substances as a process step for contribution to improvement of the final product in a process for continuous distillatory deodorization or purification of glycerides.

Referring again to Figure 1, as the oil being purified descends through the upper chamber 15s of the distilling column 15, its temperature tends to fall, because of the absorption of heat in the vaporization of volatile impurities, also because of radiation losses from the apparatus. We have found it desirable to restore this lost heat, in order that the maximum distillatory effect may be applied to the oil under treatment when it has reached a condition approaching purity. It is at this stage of treatment that the concentration of impurities in the oil is at its lowest, consequently the vapor pressure of the impurities at the liquid surface is low, causing maximum temperature and minimum absolute pressure to be desirable at this stage for completion of the purification or deodorization.

It has been found impractical to supply the additional heat necessary to regain maximum treating temperature by means of the superheated steam injected into the chamber 15s because such a large quantity of steam would be required for this purpose that undesirably high vapor velocities throughout the column would result.

Several practical methods of supplying such additional heat are available. Our preferred method comprises continuously removing the oil undergoing treatment from a lower portion of the distilling chamber 15s, passing said oil through a heating zone and returning it continuously to a zone of lower absolute pressure than that existing in that portion of the distilling chamber 15s from which the oil is withdrawn for reheating.

The oil undergoing purification descends from tray to tray in the chamber 15s through the overflow pipes 38, finally leaving the lowest tray through its overflow pipe, which is fitted with the cup-seal 51.

Overflowing the cup-seal 51, the oil undergoing purification or deodorization forms a pool 71 in the lowest portion of the chamber 15s, just above the separating-plate 35.

From said pool 71, the glycerides, which by the time of reaching this stage of the treating process have been considerably deodorized or purified, are continuously withdrawn through the valve 52 and the pipeline 53 by means of the metering pump 54, which delivers the oil through the pipeline 55 to the secondary atomizer 56, in which the liquid is atomized with several times its own volume of superheated steam according to the procedure described above in connection with the primary atomization of the glycerides in the primary atomizer 22. Superheated steam is supplied to the secondary atomizer 56 from the superheated steam header 27 through the pipeline 57.

The atomized mist of liquid enveloped in steam passes from the secondary atomizer 56, through the secondary mist-heating pipe coil 58 in the furnace 24, where it is heated to a temperature of the order of that attained in the primary mist-heating coil 29.

The atomized mist leaves the secondary coil 58 through the pipeline 59 and passes through the valve 66, the pipeline 60 and the valve 61 to the upper portion of the lower distilling chamber 15i of the distilling column 15. The chamber 15i is maintained by means of suitable vacuum equipment (not shown) at the lowest practical absolute pressure, in other words at the maximum practical vacuum. The lower distilling chamber 15i is equipped with multiple bubble-cap trays 62 and alternate oppositely positioned overflow pipes 63, all of which are similar to those installed in the upper distilling chamber 15s. Superheated steam is supplied from the header 27 through the pipeline 64 and the control valve 65, entering the lower distillation chamber 15i below the lowermost bubble-cap tray thereof. The nozzle 77 forms a vapor outlet for the lower distilling chamber 15i, said vapor outlet being connected to suitable high-vacuum-producing apparatus (not shown).

The lower chamber 15i is provided with suitable entrainment separation apparatus 78 and may be fitted, if desired, with spray apparatus for the entering atomized mist of liquid in steam, similar to that shown in Figure 5.

It will be apparent that in our process the oil undergoing purification or deodorization is withdrawn, after substantial treatment, from the lower portion of the upper distilling chamber 15s; is atomized with inert gas; is reheated to substantially maximum treating temperature; is delivered to a zone of minimum absolute pressure at substantially said maximum treating temperature and in such zone of minimum pressure is treated with fresh inert gas (steam) which is relatively little saturated with vapors of volatile impurities.

It is to be noted that in such reheating and transfer to a low-pressure distilling zone of the glyceride oil being purified there is no mixing of partially treated oil with entirely untreated oil, therefore no dilution of untreated oil with partially treated oil, which dilution would lower the partial vapor pressure (above the surface of the untreated liquid) of the impurities to be distilled away, thus making their separation from the oil more difficult.

As an alternative method of operation of the reheating feature of our process we return the reheated atomized mist from the secondary coil 58 to a median portion of the upper distilling chamber 15s, below one or more of the bubble-cap trays of said chamber, instead of to the lower chamber 15i. When operating in this manner the glyceride oil undergoing treatment is withdrawn from the lower portion of the chamber 15s at such rate that when it is reheated as atomized mist and returned as such reheated mist to a median portion of said chamber 15s, the heat which is so conveyed to said chamber will be sufficient to overcome evaporation and radiation losses therein and to cause the descending stream of liquid to arrive at the upper surface of the separating plate 35 under a temperature condition which will be suitable for direct transfer of such liquid, without further reheating, to the zone of low absolute pressure in the chamber 15i for completion of the purifying or deodorizing process.

Under this method of operation of our process, (refer to Figure 1), the valve 66 is closed, the valve 67 remains open and the reheated atomized mist from the coil 58 passes through the pipelines 59 and 68, entering the chamber 15s through the valve 69.

By returning the reheated atomized mist to the chamber 15s at a point below the point at which the original atomized mist of untreated glycerides enters said chamber we avoid dilution of said untreated glycerides by partially treated glycerides which dilution would result in reduction of the partial vapor pressure of the impurities present in the original untreated glycerides.

When returning the reheated atomized mist of oil in inert gas to a median portion of the chamber 15s, the surplus of partially purified oil (above the volume removed through the pipeline 53 for atomization and reheating) accumulates in a pool 71 above the separating plate 35 and because of admixture of reheated atomized mist entering the chamber 15s through the pipeline 68 and the valve 69, this pool of accumulating oil is of elevated temperature, suitable for prompt transfer to the finishing distilling chamber 15i.

Figure 4:
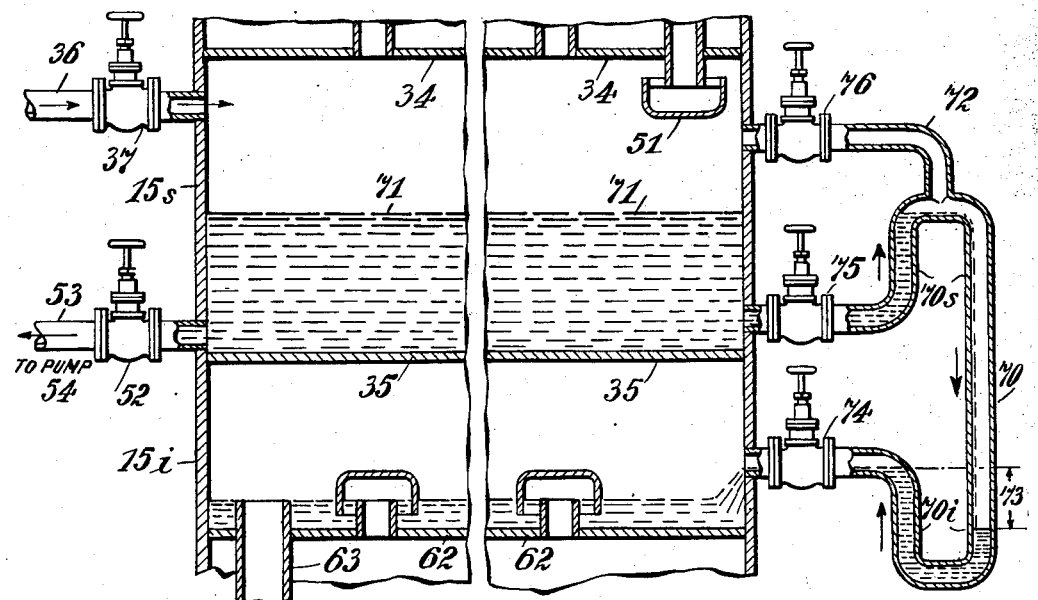
Figure 4 is a detail, in cross-section, of a portion of Figure 1, embodying arrangement of apparatus for automatic transfer of liquid from a zone of relatively low absolute pressure to a zone of even lower pressure.

In order suitably and automaticallly to effect such transfer we employ the regulating siphon loop shown in Figure 1 at 70 and in sectional detail in Figure 4.

Liquid overflowing from the cup-seal 51 falls to the separating plate 35, flowing out through the valve 52 and the pipe 53 to the metering pump 54. Surplus liquid not withdrawn by the pump 54 forms the pool 71 on the plate 35. Depth of the pool 71 is controlled by the height of the upper branch 70s of the pipe loop 70. Rising in said upper branch to its maximum height, the liquid overflows downward in the outer arm of the loop 70, rises in the inner arm of the lower branch 70i and enters the lower distilling chamber 15i above the bubble-cap tray 62.

Gravity siphoning of the pool of liquid 71 through the pipe loop 70 is prevented by the vent pipe 72, but since the absolute pressure in the chamber 15i above the plate 62 is lower than that in the chamber 15s at a point just above the pool 71, it is necessary to make suitable provision to avoid discharge of vapor from the chamber 15s to the chamber 15i through the vent pipe 72 and the pipe loop 70.

It is for this purpose that we provide the lower branch 70i of the pipe loop 70, making such lower branch of such dimensions that the distance 73 will provide for sufficient static pressure of liquid in the inner arm of the lower branch 70i just to overbalance the pressure differential between the two chambers connected by the pipe loop 70. It will be apparent that the above-described design of overflow pipe loop 70 and vent pipe 72 in combination will maintain the pool 71 at uniform depth and will automatically transfer to the chamber 15i all surplus of liquid entering said pool 71 over the amount withdrawn through the pipeline 53.

When all liquid flowing out through the pipeline 53 is returned from the secondary mist-heating coil to the upper distilling chamber, the amount of liquid overflowing through the pipe loop 70 will be equal to the total amount fed to the chamber 15s through the valve 31 (Figure 1). The pipe loop 70 and the vent pipe 72 are equipped with shut-off valves 74, 75 and 76 as shown in Figure 4.

In the lower distilling chamber 15i (Figure 1) the deodorization or purification process is completed by vaporization of the small amount of remaining impurities from the bubble-cap trays 62 under minimum absolute pressure and with the aid of the superheated steam which enters through the pipeline 64 and the valve 65.

Overflowing from the cup-seal 79 beneath the lowermost tray, the completely deodorized oil accumulates in a pool 80 in the lower portion of the chamber 15i, from which pool the oil is withdrawn continuously through the valve 81 and the pipeline 82 by the metering pump 83. The depth of the pool 80 is regulated by the vented pipe loop 84 in the pipeline 82.

The metering pump 83 discharges the purified or deodorized oil through the pipeline 85 and the heat exchange apparatus 20, in which latter the treated oil gives up a substantial amount of heat to the entering de-aerated oil. Construction of the heat exchange apparatus 20 is such that there is no actual contact or mixing between the two types of liquid flowing therethrough.

From the heat exchanger 20 the deodorized or purified oil passes through the pipeline 86 and the shell-and-tube cooler 87. Water or other suitable cooling fluid is supplied to the cooler 87 through the pipeline 88, overflowing to waste or to further suitable use through the pipeline 89.

Having been cooled to suitable discharge temperature in the cooler 87, the deodorized or purified oil continues through the pipeline 90 to the vacuum receiving vessel 91, forming a pool 92 therein, from which it is removed continuously by the pump 93 which pumps the treated oil through the filter 94 and the pipeline 95 to point of storage or use (not shown).

The bypass valve 96 at the pump 93 is controlled by the float 97 within the receiver 91, acting to maintain a substantially uniform level of liquid in the pool 92 together with continuous flow through the filter 94. The check-valve 98 acts to prevent entrance of air to the system through the discharge line to the filter.

The vacuum receiver 91 is connected through the nozzle 91a to vacuum-producing apparatus (not shown) or alternatively may be maintained with an internal atmosphere of any suitable water-free inert gas, such as, for example, nitrogen or carbon dioxide gas.

Suitable vacuum apparatus (not shown) is so arranged as to maintain lowest practicable absolute pressures at the two vapor outlet nozzles 48 and 77. If in any application of our invention it is desirable to recover the distilled impurities, suitable condensation apparatus for such recovery may be incorporated with the vacuum apparatus or interposed between the vapor outlet nozzles and the vacuum apparatus. The waste receiver 44, the vacuum de-aerator 10 and the finished product receiver 91 are also connected to suitable vacuum-producing apparatus.

Figure 2:
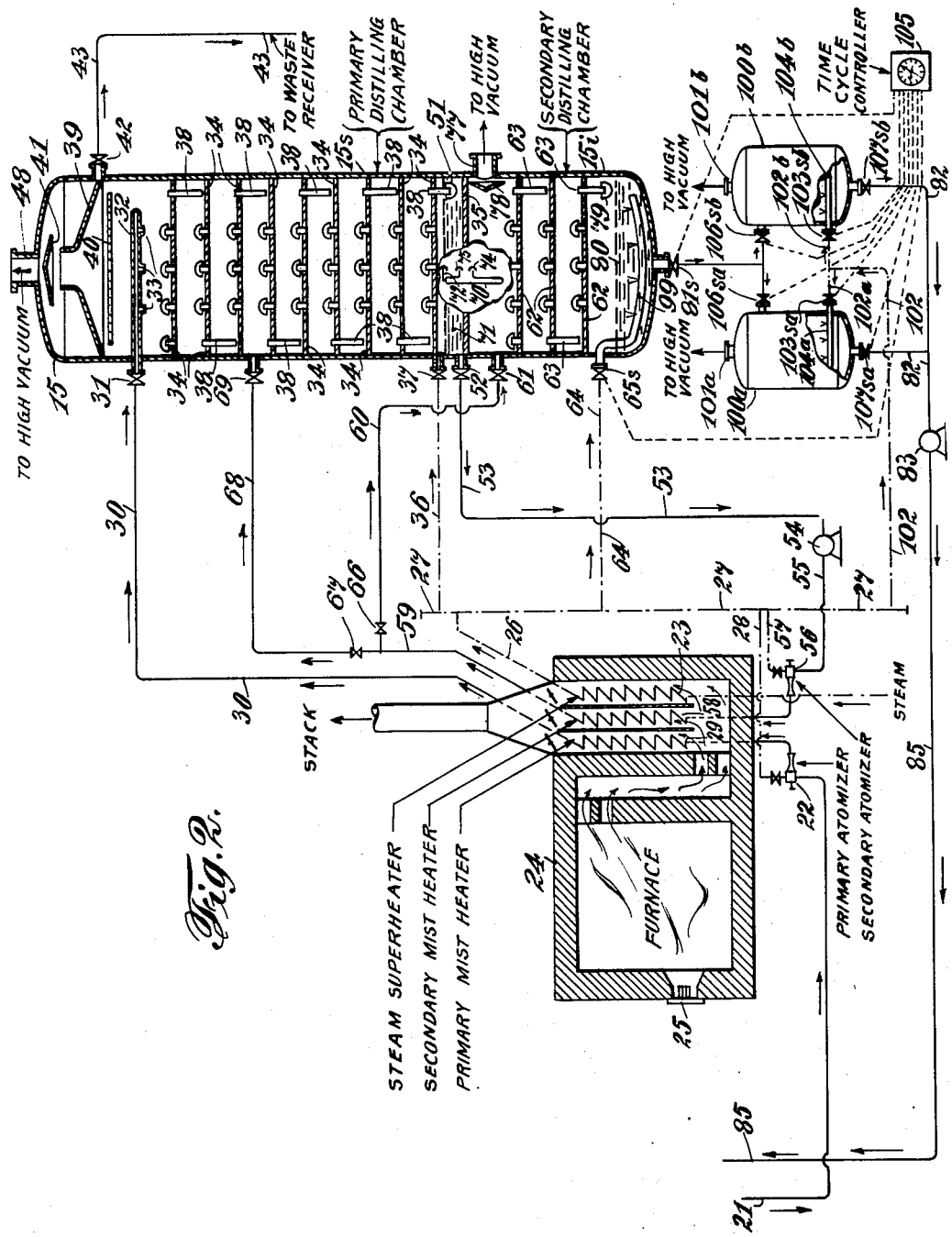
Figure 2 is a diagrammatic elevation, partly in section, of a variant form of apparatus for said operation.

Figure 2 shows suitable equipment for an alternative method of operation of our process invention. All items of the equipment from the metering feed pump 8 through the furnace 24 with its enclosed mist heating coils 29 and 58, its steam superheating coil 23 and its fluid-fuel burner 25 are identical with similarly numbered items in Figure 1. Construction of the upper distillation chamber 15s is identical in all respects with the design shown in Figure 1, whereas the construction of the lower distillation chamber 15i is modified considerably as will be apparent from examination of Figure 2.

When operating the process of our invention in apparatus assembled in accordance with Figure 2, the atomized mist of reheated oil dispersed in inert gas returning from the secondary mist heating coil 58 through the pipeline 60 and the valve 61 enters the lower distillation chamber 15i and passing downward through the trays 62 thereof forms a pool 80 in the lower portion of said chamber.

Superheated steam entering the lower portion of the chamber 15i through the pipeline 64 and solenoid-operated valve 65s passes through the sparger or perforated distributor 99 below the surface of the pool 80 and bubbles through said pool of liquid contributing to further purification thereof before passing through the bubble-cap tray or trays 62 and thence out through the nozzle 77 to the high vacuum apparatus. The accumulation and discharge of the pool 80 are controlled in conjunction with the final deodorization or purification of the oil being treated, which final deodorization or purification is performed alternately in sequence in the finishing vacuum vessels 100a and 100b, which are connected to high vacuum apparatus (not shown) through the nozzles 101a and 101b and are supplied with superheated steam from the header 27 through the pipelines 102, 102a and 102b, the solenoid-operated valves 103sa and 103sb and the distribution spargers 104a and 104b.

By means of the electrical time-cycle controller 105, the solenoid-operated valves 65s, 81s, 103sa and 103sb, 106sa and 106sb, 107sa and 107sb are so operated in sequence that small charges of oil being treated are delivered in turn to each of the vessels 100a and 100b respectively, subjected therein to steaming by superheated steam at low absolute pressure, each charge in turn and in sequence in its respective vessel and for a definitely determined period of time. Such treated charges of oil are then withdrawn in sequence from said respective vacuum vessels 100a and 100b through the solenoid-operated valves 107sa and 107sb and through the pipeline 82 by the metering pump 83.

By operation in this manner insurance is had of absolute avoidance of contamination of finished purified oil by even the smallest possible percentage of oil only partially purified, while at the same time a substantially constant flow of purified oil is maintained through the metering pump 83 and the pipeline 85, thus providing a constant flow of heat from the finished purified oil to the untreated oil flowing through the heat exchanger 20 (Figure 1).

It is to be noted that in this variant of our process invention the pool 80 is of variable rather than of fixed depth. A typical log of the time-cycle control of the final purification operation as practiced according to our process invention is set forth in Figure 6, for purposes of example only, it being understood that the time-cycle may be varied at will to suit the requirements of various oils which may undergo purification or deodorization in accordance with the process of our invention.

Referring to Figure 6, at initial or zero time, consider the pool 80 to be substantially at a minimum, or zero contents, the vessels 100a and 100b to be empty, the valve 65s to be open, supplying superheated steam to the sparger 99, and all other solenoid-operated valves (81s, 103sa, 103sb, 106sa, 106sb, 107sa, 107sb) to be closed. Partially purified oil enters the pool 80 at such rate that at time of plus 25 minutes said pool contains quantity "Y" of partially purified oil, which is a suitable quantity for a single charge for treatment in either of the finishing vessels 100a or 100b. The electrical contacts of the time-cycle controller will then operate the solenoid valves as shown in Figure 6, at time plus 25, valve 107sb being manually held closed at this beginning point of the cycle only. The charge of partially purified oil is delivered to vessel 100a, the delivery being represented by the graphic lines c—d between times plus 25 and plus 30. At time plus 30, the electric controller closes valve 81s and opens valves 65s and 103sa, as shown on the chart in Figure 6.

Admission of superheated steam through valve 103sa to the charge being finished in vessel 100a continues until time plus 50, when valve 103sa is automatically closed by the time-cycle controller. The charge of oil then rests under vacuum in the vessel 100a until time plus 55, when valve 107sa opens and the oil flows to pump 83, said flow being represented by the graphic line e—f. Simultaneously at the time plus 55, other solenoid-operated valves are automatically reset as shown in Figure 6 and a new charge of partially purified oil flows as represented by the lines c'—d' from the pool 80 to the vessel 100b, there to receive finishing treatment and be discharged in its turn, as represented by the line e'—f', during the time interval between plus 85 and plus 115. The finishing cycles then continue automatically and alternately between the vessels 100a and 100b. Examination of the graphic chart in Figure 6 will make it clear that there will be continuous flow through the pump 83, said flow being represented by the repeating graphic lines e—f and e'—f'.

In operation of our process by the method of time-cycle control above described, an alternative equipment assembly may be used, the chief feature of which is combination of the distilling chambers 15s and 15i of Figure 2 in a single chamber, in which case the pool 80 is located at the bottom of said single chamber, the metering pump 54 withdraws oil for reheating from said pool 80 and the time-cycle apparatus controls and directs the outflow from said pool 80 of excess oil above the quantity recycled to a median portion of the single distilling chamber through the pipelines 59 and 68 and the valve 69.

Operation of our process in the equipment assembly indicated in Figure 2, from the point of discharge of purified oil from the pump 83 through the pipeline 85 toward the heat exchanger 20 and on through the cooling and final filtration of the purified oil, is identical with its operation as described in connection with Figure 1.

Figure 3:
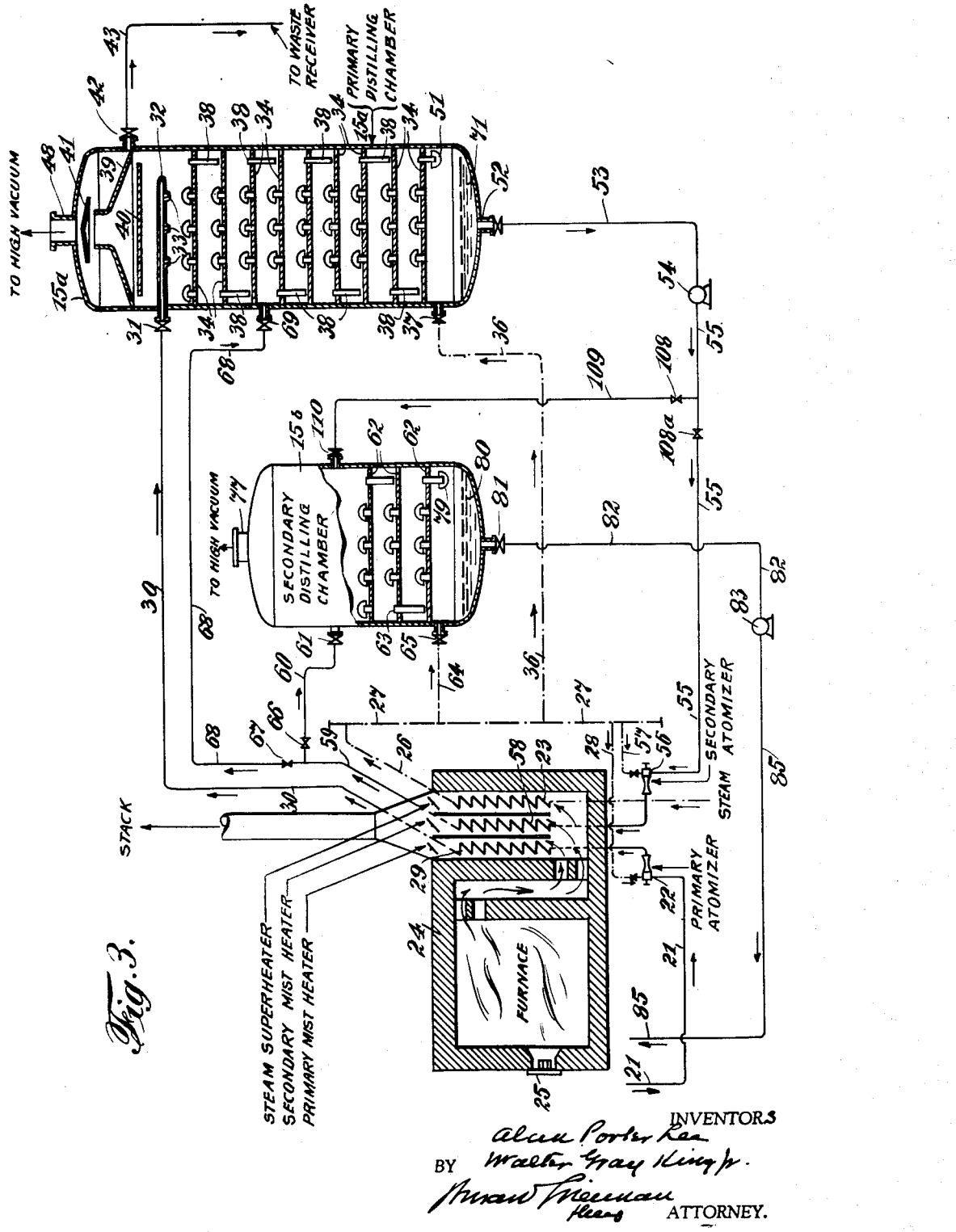
Figure 3 is a diagrammatic elevation, partly in section, of an alternate form of the apparatus shown in Figure 1.

Figure 3 of our drawings illustrates alternative equipment assembly to that shown in Figure 1, differing from the latter only in the substitution of two entirely separate distilling chambers 15a and 15b respectively for the super-imposed chambers 15s and 15t of the tower 15 of Figure 1. In operation of our process in the Figure 3 equipment assembly according to the optional method of recycling incompletely purified glycerides through the secondary atomizer 56, the secondary mist heating coil 58, pipelines 59 and 68 to the distillation chamber 15a, transfer of suitable amount of partially treated glycerides to the secondary treating tower 15b can be accomplished by suitable proportioning of the flow of atomized mist between the valves 66 and 67, each of said valves being a metering throttle valve, thus passing the desired amount of reheated glycerides in the form of atomized mist to each of the primary and secondary distilling chambers at all times, or by diverting to the secondary distilling chamber a suitable quantity of unatomized partially purified glycerides, from the discharge pipeline 55 of the metering pump 54, through the valve 108, the pipeline 109 and the inlet valve 110. The valve 108a can be throttled to facilitate such operation.

From the descriptions as given hereinabove it will be readily apparent that our process invention successfully meets the basic requirements of a satisfactory continuous process for deodorization or purification of glyceride oils, said requirements also having been set forth in full detail above.

By use of the above-described operating methods, we are able to produce in a continuous process, deodorized glyceride oils of improved purity and quality.

What we claim is:

1. In a process for continuous purification or deodorization of glycerides the steps which comprise subjecting said glycerides after suitable preheating to contact with a suitable inert gas in counter-current flow in a primary distilling zone of sub-atmospheric pressure for a period of time sufficient to distill a substantially major proportion of the odorous and other volatile impurities contained in said glycerides, continuously transferring partially purified or partially deodorized glycerides to an independent secondary distilling zone of sub-atmospheric pressure in which secondary zone said partially purified or partially deodorized glycerides are subjected to a secondary counter-current contact with substantially pure inert gas at a condition of sub-atmospheric pressure substantially lower than the pressure existing at the last point of contact of said partially purified or partially deodorized glycerides with inert gas in said primary distilling zone, maintaining said secondary counter-current contact of glycerides with inert gas in said secondary distilling zone for a period of time sufficient to distill the substantial remaining proportion of the odorous and other volatile impurities contained in said glycerides and continuously removing purified or deodorized glycerides from said secondary distilling zone.

2. In a process for continuous purification or deodorization of glycerides the steps which comprise subjecting said glycerides after suitable preheating to contact with a suitable inert gas in counter-current flow in a primary distilling zone of sub-atmospheric pressure for a period of time sufficient to distill a substantial major proportion of the odorous and other volatile impurities contained in said glycerides, continuously withdrawing partially purified or partially deodorized glycerides from a lower portion of said primary distilling zone, continuously reheating said withdrawn partially purified or partially deodorized glycerides to suitable temperature for further distillation of volatile impurities, transferring said reheated glycerides to an independent secondary distilling zone of sub-atmospheric pressure in which secondary zone said reheated partially purified or partially deodorized glycerides are subjected to a secondary counter-current contact with substantially pure inert gas at a condition of sub-atmospheric pressure substantially lower than the pressure existing at the last point of contact of said partially purified or partially deodorized glycerides with inert gas in said primary distilling zone, maintaining said secondary counter-current contact of glycerides with inert gas in said secondary distilling zone for a period of time sufficient to distill the substantial remaining proportion of the odorous and other volatile impurities contained in said glycerides and continuously removing purified or deodorized glycerides from said secondary distilling zone.

3. In a process for continuous purification or deodorization of glycerides the steps which comprise subjecting said glycerides after suitable preheating to contact with a suitable inert gas in counter-current flow in a primary distilling zone of sub-atmospheric pressure for a period of time sufficient to distill a substantially major proportion of the odorous and other volatile impurities contained in said glycerides, maintaining in a lower portion of said primary distilling zone a body of variable depth of partially purified or partially deodorized glycerides, transferring measured volumes of said partially purified or partially deodorized glycerides alternately and sequentially to each of multiple independent secondary distilling zones of sub-atmospheric pressures each substantially lower than the pressure existing at the last point of contact of glycerides and inert gas in said primary distilling zone, sequentially contacting said measured volumes of partially purified or partially deodorized glycerides with substantially pure inert gas in each of said independent secondary distilling zones for suitable time periods to complete purification or deodorization of said measured volumes of glycerides and so regulating sequential discharge of said measured volumes of glycerides from said multiple secondary distilling zones as to maintain substantially continues uniform outflow therefrom of fully purified or fully deodorized glycerides free of any admixture of partially purified or partially deodorized glycerides.

4. The process of continuous purification or deodorization of glycerides which comprises preheating glycerides to a temperature suitable for vacuum distillation of odorous or other volatile impurities, expanding said preheated glycerides into a primary distilling zone of sub-atmospheric pressure, subjecting said preheated and expanded glycerides to contact with suitable inert gas in counter-current flow in said primary distilling zone for sufficient time to distill a substantially major proportion of said odorous and other volatile impurities, continuously removing said partially treated glycerides to an independent secondary distilling zone where said glycerides are subjected in counter-current flow to contact with substantially pure inert gas substantially free of volatile impurities for time sufficient to distill the remaining substantially minor proportion of said odorous and other volatile impurities at sub-atmospheric pressure substantially lower than the pressure existing at the last point of contact between inert gas and partially treated glycerides in said primary distilling zone and removing purified or deodorized glycerides substantially free of any untreated or partially untreated glycerides continuously from said secondary distilling zone.

5. The process of continuous purification or deodorization of glycerides which comprises preheating glycerides to a temperature suitable for vacuum distillation of odorous or other volatile impurities, expanding said preheated glycerides into a primary distilling zone of sub-atmospheric pressure, subjecting said preheated and expanded glycerides to contact with suitable inert gas in counter-current flow in said primary distilling zone for sufficient time to distill a substantially major proportion of said odorous and other volatile impurities, continuously removing said partially treated glycerides from said primary distilling zone, continuously reheating said removed partially treated glycerides to a temperature suitable for further vacuum distillation of odorous and other volatile impurities, continuously transferring said reheated partially treated glycerides to an independent secondary distilling zone where said reheated glycerides are subjected in counter-current flow to contact with substantially pure inert gas substantially free of volatile impurities for time sufficient to distill the remaining substantially minor proportion of said odorous and other volatile impurities at sub-atmospheric pressure substantially lower than the pressure existing at the last point of contact between inert gas and partially treated glycerides in said primary distilling zone and removing purified or deodorized glycerides substantially free of any untreated or partially treated glycerides continuously from said secondary distilling zone.

6. The process of continuous purification or deodorization of glycerides as described in claim 4 which is characterized by continuously withdrawing partially purified or partially deodorized glycerides from a lower portion of the primary distilling zone, continuously reheating said withdrawn partially treated glycerides to a temperature suitable for further distillation of odorous and other volatile impurities, continuously returning said reheated partially treated glycerides to a median portion of said primary distilling zone where said returned reheated glycerides are mixed with other partially purified or partially deodorized glycerides free of any wholly unpurified or wholly undeodorized glycerides and contacting the mixture of partially treated glycerides so produced with inert gas in counter-current flow within said primary distilling zone.

7. The process of continuous purification or deodorization of glycerides as described in claim 5 which is characterized by continuously withdrawing partially purified or partially deodorized glycerides from a lower portion of the primary distilling zone, continuously reheating said withdrawn partially treated glycerides to a temperature suitable for further distillation of odorous and other volatile impurities, continuously returning said reheated partially treated glycerides to a median portion of said primary distilling zone where said returned reheated glycerides are mixed with other partially purified or partially deodorized glycerides free of any wholly unpurified or wholly undeodorized glycerides and contacting the mixture of partially treated glycerides so produced with inert gas in counter-current flow within said primary distilling zone.

8. The process of continuous deodorization which comprises preheating glycerides to a temperature suitable for vacuum distillation of odorous or other volatile impurities, expanding said preheated glycerides into a primary distilling zone of sub-atmospheric pressure, subjecting said preheated and expanded glycerides to contact with suitable inert gas in counter-current flow in said primary distilling zone for a period of time sufficient to distill a substantially major proportion of the odorous and other volatile impurities contained in said glycerides, maintaining in a lower portion of said primary distilling zone a body of variable depth of partially purified or partially deodorized glycerides, transferring measured volumes of said partially purified or partially deodorized glycerides alternately and sequentially to each of multiple independent secondary distilling zones of sub-atmospheric pressures each substantially lower than the pressure existing at the last point of contact of glycerides and inert gas in said primary distilling zone, sequentially contacting said measured volumes of partially purified or partially deodorized glycerides with substantially pure inert gas in each of said independent secondary distilling zones for suitable time periods to complete purification or deodorization of said measured volumes of glycerides and so regulating sequential discharge of said measured volumes of glycerides from said multiple secondary distilling zones as to maintain substantially continuous outflow therefrom of fully purified or fully deodorized glycerides free of any admixture of partially untreated or wholly untreated glycerides.

9. The process of continuous purification or deodorization of glycerides as described in claim 8 which is characterized by continuously withdrawing partially purified or partially deodorized glycerides from a lower portion of the primary distilling zone, continuously reheating said withdrawn partially treated glycerides to a temperature suitable for further distillation of odorous and other voltatile impurities, continuously returning said reheated partially treated glycerides to a median portion of said primary distilling zone where said returned reheated glycerides are mixed with other partially purified or partially deodorized glycerides free of any wholly unpurified or wholly undeodorized glycerides and contacting the mixture of partially treated glycerides so produced with inert gas in counter-current flow within said primary distilling zone.

10. The process of continuous purification or deodorization of glycerides as described in claim 8 which is characterized by continuously withdrawing partially purified or partially deodorized glycerides from a lower portion of the primary distilling zone, continuously reheating said withdrawn partially treated glycerides to a temperature suitable for further distillation of odorous and other volatile impurities, continuously returning said reheated partially treated glycerides to a median portion of said primary distilling zone where said returned reheated glycerides are mixed with other partially purified or partially decdorized glycerides free of any wholly unpurified or wholly undeodorized glycerides and contacting the mixture of partially treated glycerides so produced with inert gas in counter-current flow within said primary distilling zone while separating entrained liquids and refluxed or refluxing condensed volatiles from the vapors present in the distilling zone or zones at a point or points within said zone or zones above the uppermost liquid body therein, collecting said separated entrained liquids and condensed volatiles within said distilling zone or zones, wholly removing said separated entrained liquids and condensed volatiles from said distilling zone or zones without any readmixture with the glycerides undergoing purification or deodorization of any portion of said separated entrained liquids or condensed volatiles.

11. The process of continuous purification or deodorization of glycerides which comprises preheating glycerides to a temperature suitable for vacuum distillation of odorous or other volatile impurities, expanding said preheated glycerides into a primary distilling zone of sub-atmospheric pressure, subjecting said preheated and expanded glycerides to contact with suitable inert gas in counter-current flow in said primary distilling zone for sufficient time to distill a substantially major proportion of said odorous and other volatile impurities, continuously removing said partially treated glycerides from said primary distilling zone, continuously reheating said removed partially treated glycerides to a temperature suitable for further vacuum distillation of odorous and other volatile impurities, continuously transferring said reheated partially treated glycerides to an independent secondary distilling zone where said reheated glycerides are subjected in counter-current flow to contact with substantially pure inert gas substantially free of volatile impurities for time sufficient to distill the remaining substantially minor proportion of said odorous and other volatile impurities at sub-atmospheric pressure substantially lower than the pressure existing at the last point of contact between inert gas and partially treated glycerides in said primary distilling zone and removing purified or deodorized glycerides substantially free of any untreated or partially treated glycerides continuously from said secondary distilling zone, while continuously withdrawing partially purified or partially deodorized glycerides from a lower portion of the primary distilling zone, continuously reheating said withdrawn partially treated glycerides to a temperature suitable for further distillation of odorous and other volatile impurities, continuously returning said reheated partially treated glycerides to a median portion of said primary distilling zone where said returned reheated glycerides are mixed with other partially purified or partially deodorized glycerides free of any wholly unpurified or wholly undeodorized glycerides and contacting the mixture of partially treated glycerides so produced with inert gas in counter-current flow within said primary distilling zone, in which process separation of entrained liquids and refluxed or refluxing condensed volatiles from the vapors present in the distilling zone or zones is accomplished within said distilling zone or zones at a point or points above the uppermost liquid body therein, said separated entrained liquids and condensed volatiles being collected within and wholly removed from said distilling zone or zones without readmixture with the glycerides undergoing purification or deodorization of any portion of said separated entrained liquids or condensed volatiles.

12. The process of continuous purification or deodorization of glycerides as described in claim 4 which is characterized by continuously withdrawing partially purified or partially deodorized glycerides from a lower portion of the primary distilling zone, continuously reheating said withdrawn partially treated glycerides to a temperature suitable for further distillation of odorous and other volatile impurities, continuously returning said reheated partially treated glycerides to a median portion of said primary distilling zone where said returned reheated glycerides are mixed with other partially purified or partially deodorized glycerides free of any wholly unpurified or wholly undeodorized glycerides and contacting the mixture of partially treated glycerides so produced with inert gas in counter-current flow within said primary distilling zone while separation of entrained liquids and refluxed or refluxing condensed volatiles from the vapors present in the distilling zone or zones is accomplished within said distilling zone or zones at a point or points above the uppermost liquid body contained therein, said separated entrained liquids and condensed volatiles being collected within and wholly removed from said distilling zone or zones without readmixture with the glycerides undergoing purification or deodorization of any portion of said separated entrained liquids or condensed volatiles.

ALAN PORTER LEE.
WALTER GRAY KING, Jr.

CERTIFICATE OF CORRECTION.

Patent No. 2,368,669. February 6, 1945.

ALAN PORTER LEE, ET AL.

It is hereby certified that error appears in the printed specification of the above numbered patent requiring correction as follows: Page 2, first column, line 53, for "Practially" read --Practically--; and lines 66-67, for "miximum" read --maximum--; page 4, first column, line 36, for "(Fig." read -- (Fig- --; page 7, second column, line 65, claim 3, for "contimues" read --continuous--; page 8, second column, line 58, claim 9, for "volatile" read --volatile--; and that the said Letters Patent should be read with this correction therein that the same may conform to the record of the case in the Patent Office.

Signed and sealed this 5th day of June, A. D. 1945.

Leslie Frazer (Seal)

Acting Commissioner of Patents.